UNITED STATES PATENT OFFICE.

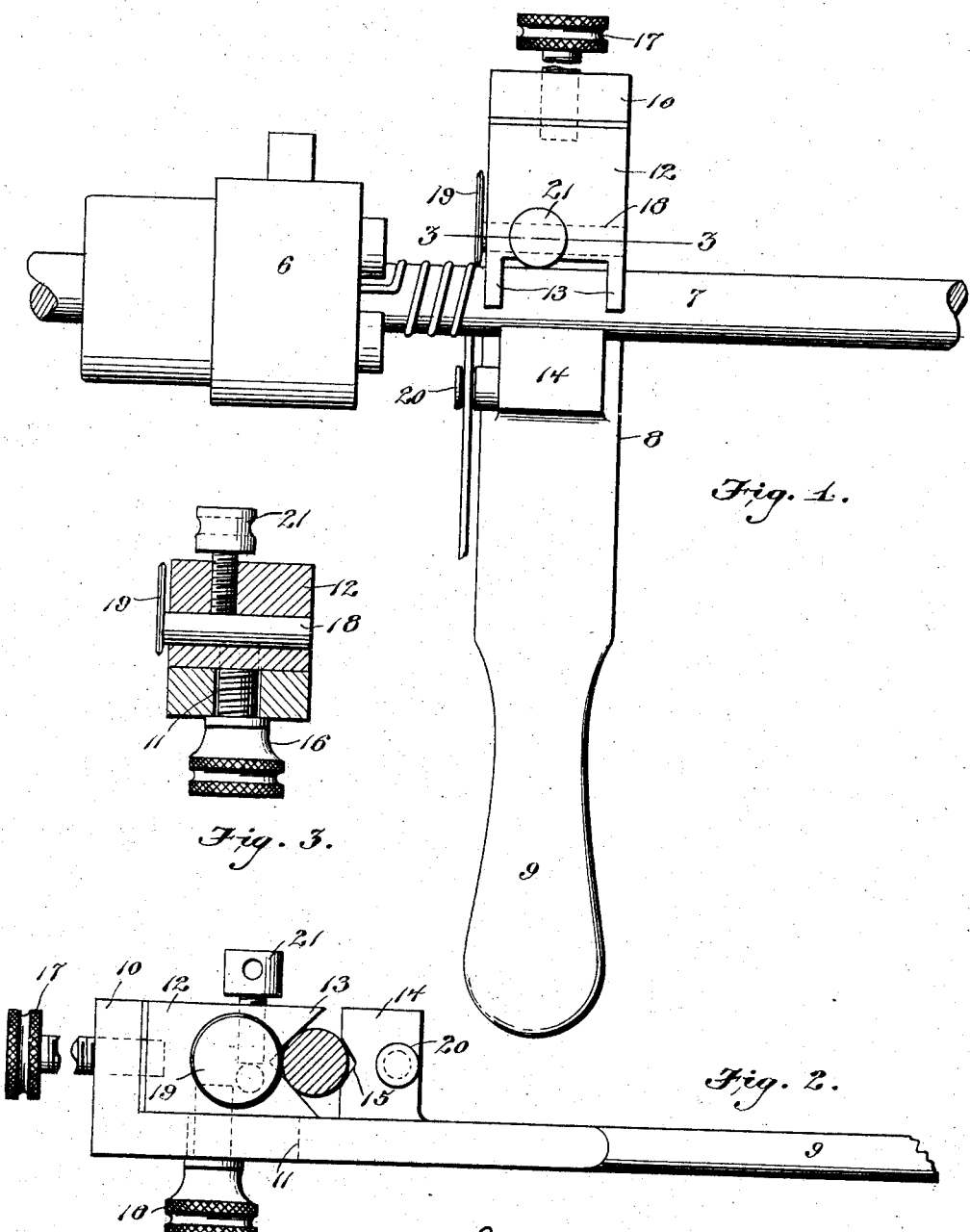

JAMES LINTON MOORE, OF ATLANTA, GEORGIA.

WINDING-TOOL FOR COILS.

No. 865,116.               Specification of Letters Patent.            Patented Sept. 3, 1907.

Application filed December 20, 1906. Serial No. 348,738.

*To all whom it may concern:*

Be it known that I, JAMES LINTON MOORE, a citizen of the United States, residing at Atlanta, in the county of Fulton and State of Georgia, have invented new and useful Improvements in Winding-Tools for Coils, of which the following is a specification.

This invention is a tool to be used in winding spiral springs and has for its object to provide an improved device for gaging the pitch of the spring and for feeding the wire regularly and uniformly to the mandrel on which it is wound.

The tool is so constructed as to be capable of application to a mandrel of any usual size, so that it may be used in connection with the manufacture of springs of any diameter.

The invention is illustrated in the accompanying drawings, in which

Figure 1 is a plan view thereof showing the manner of use of the tool. Fig. 2 is a side view. Fig. 3 is a section on the line 3—3 of Fig. 1.

In the manufacture of springs of the kind to which this invention relates, being those formed of coiled wire, it is common to wind the wire upon the mandrel held by a chuck in the lathe, a tool being used to hold the wire and space the spring while it is being wound.

In the drawings, 6 indicates a chuck which may be rotated in a lathe or by any other suitable means, and 7 is the mandrel held in the chuck. The size of the mandrel is varied according to the diameter of the spring to be made.

The tool forming the subject of the present invention consists of a flat bar or piece of metal 8 provided at one end with a handle 9 and up-set at its other end, as at 10, to form a back stop or flange. The bar 8 is slotted lengthwise for a distance, as indicated at 11, and mounted thereon over the slot is a sliding block 12 having on each side projecting jaws 13 provided with a V-shaped or angular notch. Opposite the sliding block 12 is a fixed block 14, mounted on the bar 8 and having in its front face or side an angular groove 15 opposite the jaws 13. The jaws 13 are spaced apart far enough to allow the block 14 to pass therebetween, so that a small mandrel can be gripped between the jaws and the fixed block.

A set screw 16 extends through the slot 11 into the block 12 and serves to hold the block in place. An adjusting screw 17 is tapped through the flange 10 and bears at its point in a depression in the block 12, and serves to advance the block to the desired engagement or contact with the mandrel.

To gage and determine the pitch or distance apart of the coils forming the spring the block 12 is bored transversely to receive the shank 18 of a disk 19 which is mounted or turned eccentrically upon its said shank, and properly positioned to stand adjacent to the mandrel held in the jaws. On the opposite side of the mandrel is a grooved stud 20 which projects from the fixed block 14 and forms a guide for the wire which is fed thereover. The pitch of the spring will depend upon the relative adjustment of the spacing disk 19. This adjustment is effected by moving the disk closer to or farther from the side of the block, and when set at proper adjustment the part may be fixed by the set screw 21, which is tapped through the block and bears at its point upon the shank 18.

In the use of the device, the end of the wire is fastened in the chuck, and the tool is then placed on the mandrel, with the mandrel between the jaws 13 and the fixed block 14, then by means of the adjusting screw 17 the block 12 is advanced until the jaws 13 grip the mandrel sufficiently tight to hold the tool, but nevertheless loose enough to allow the mandrel to turn in the tool. The eccentric disk 19 is then turned down until its edge comes in contact with the side of the mandrel, and it is drawn out or toward the chuck as far as necessary to get the required pitch or distance between the coils, and it is then fixed by the set screw 21. If a closed spring is desired, the eccentric is turned completely away from the mandrel. The machine is then started, the wire being fed over the grooved stud 20, and the wire pushes the tool along the mandrel toward the outer end, the coils being formed by the rotation of the mandrel, and all that is necessary for the operator to do is to hold the tool in his hand and it will wind a uniform spring.

It will be seen that the tool may be applied to a mandrel of any ordinary size, since the block 12 can be advanced or retracted accordingly. Since the tool may thus be adjusted for springs of various diameters and also those of various pitch, it has a wide range of application and usefulness in the manufacture of coiled wire springs. The shank 18 of the eccentric disk may be graduated if desired, to form an index to indicate the pitch of the spring, the pitch being obviously the difference or variation in distance between the outer edge of the disk and the groove in the pin 20, through which the wire is fed.

I claim:

1. A winding tool for coils, having a pair of jaws adapted to engage a mandrel and slidable along the same, and wire guides located beside the mandrel upon the opposite jaws respectively, one of said guides being adjustable to vary the pitch of the coils.

2. A winding tool for coils, having a pair of jaws adapted to engage a mandrel and slidable along the same, and a wire guide adjustable along the mandrel laterally with respect to the jaws, to vary the pitch of the coils.

3. A winding tool for coils, having a pair of jaws adapted to engage a mandrel and slidable along the same, and wire guides located beside the mandrel upon the opposite jaws respectively, one of said guides being adjustable to or from the same.

4. A winding tool for coils, having a pair of jaws adapted to engage a mandrel, and wire guides located beside the mandrel upon the opposite jaws respectively, one of said guides comprising a shank adjustable lengthwise and rotatable in one of the jaws, and a head upon said shank, arranged to be turned to or from the mandrel.

5. The combination with a mandrel, of a bar having fixed and movable jaws thereon between which the mandrel is located, and means to fix the movable jaw at adjustment, a grooved stud on the side of one jaw, forming a feeding wire guide, and an adjustable wire guide on the side of the other jaw, forming a pitch gage for the coils.

In testimony whereof I have signed my name to this specification in the presence of two subscribing witnesses.

JAMES LINTON MOORE.

Witnesses:
L. A. WOODS,
C. STEWART.